UNITED STATES PATENT OFFICE.

ROY A. JACOBSEN, OF ST. LOUIS, MISSOURI.

SOLDER FOR ALUMINUM.

1,341,508.

Specification of Letters Patent.

Patented May 25, 1920.

No Drawing. Application filed January 2, 1919. Serial No. 269,340.

*To all whom it may concern:*

Be it known that I, ROY A. JACOBSEN, a citizen of the United States, residing at the city of St. Louis, in the State of Missouri, have invented certain new and useful Improvements in Solders for Aluminum, of which the following is a specification.

This invention consists in an improvement in solders for uniting aluminum, and can be used not only for uniting two parts, both made of aluminum, but also two parts one of which is aluminum and the other of some other material as, for instance, brass or copper.

Attempts have heretofore been made to produce a solder for joining aluminum parts, but the results have not been satisfactory.

This present solder is compounded as follows, the ingredients being in substantially the proportions herein named: sixty seven and sixty hundredths (67.60) per cent. tin; sixteen and ninety hundredths (16.90) per cent. zinc; two and eighty two hundredths (2.82) per cent. metallic bismuth; one and forty one hundredths (1.41) per cent. aluminum; and eleven and twenty seven hundredths (11.27) per cent. phosphorus tin. The phosphorus tin is substantially five per cent. phosphorus and ninety-five per cent. tin.

Of course it is to be understood that the ordinary solder will not stick to aluminum, but after the above-described aluminum solder has been applied to aluminum, ordinary solder for tin will stick to it.

In using prior solders for aluminum it has been necessary to use the oxy-acetylene welding process, but the solder of this invention can be used with an ordinary soldering-iron, preferably heated as hot as possible, and preferably to a substantial extent hotter than when used for soldering tin.

If desired, a blow-pipe or oxy-acetylene welding apparatus may be used after the parts to be joined have been tinned as above described by the use of the iron.

The method of melting this solder at the joint is the same as practised with any other solder. On account of the ingredients of this article the resultant joint is stronger than the aluminum itself.

In this solder the zinc is used for strength and the tin for greater fusibility.

It is well known that lead will not unite with certain substances, as, for instance, aluminum, but it has been found in practice that this solder can be used to prepare the surface of aluminum for union with lead where that is desired, in which use of this solder the aluminum is first tinned with this solder and thereupon ordinary soft solder can be used to form a union with the said tinned part of the aluminum article, there being no antipathy of the lead in the soft solder to union with this solder.

While an accurate statement of ingredients for a combination that has been tried and found entirely satisfactory is hereinabove given for the purpose of readily enabling others skilled in the art to which this invention relates, to make and use the same and for that purpose is stated with considerable precision, yet it is not intended by such minuteness of statement to limit the scope of this patent thereby, it being understood that only substantial compliance with the proportions named is requisite.

The main ingredient of this composition of matter wherein the same differs from the prior art is phosphorus tin in a proportion of substantially ten per cent. of the whole and in the composition of the whole tin is in quantity the main item.

One or more of the minor ingredients may be omitted without departing from the spirit of this invention, the gist of which is within the scope of the following claim.

I claim:

An aluminum solder including sixty seven and sixty hundredths (67.60) per cent. tin; sixteen and ninety hundredths (16.90) per cent. zinc; two and eighty two hundredths (2.82) per cent. metallic bismuth; one and forty one hundredths (1.41) per cent. aluminum; and eleven and twenty seven hundredths (11.27) per cent. phosphorus tin, substantially as set forth.

In testimony whereof I hereunto affix my signature.

ROY A. JACOBSEN.